May 31, 1966
D. L. PHILLIPS
3,254,193
ARC-WELDING MEANS

Filed Feb. 19, 1963

INVENTOR:
Delbert L. Phillips

By Smyth, Roston & Pavitt
Attorneys

May 31, 1966  D. L. PHILLIPS  3,254,193
ARC-WELDING MEANS
Filed Feb. 19, 1963  3 Sheets-Sheet 3

INVENTOR:
Dalbert L. Phillips
By Smyth, Roston & Pavitt,
Attorneys

United States Patent Office 3,254,193
Patented May 31, 1966

3,254,193
ARC-WELDING MEANS
Delbert L. Phillips, Malibu, Calif., assignor to Pulse Arc Welder Company, Santa Monica, Calif., a corporation of California
Filed Feb. 19, 1963, Ser. No. 259,588
13 Claims. (Cl. 219—95)

The present invention relates to means for welding members together and, more particularly, to means for producing an electrical discharge between a pair of workpieces and for positioning the workpieces so that they may be welded together by the discharge.

It is very frequently desirable to be able to weld a pair of workpieces such as a pair of small wires together in an end-to-end relation by means of a butt weld or to weld a wire to the surface of a flat member. One form of welder that has been available heretofore for welding a pair of workpieces together is the so-called resistance welder. In this form of welder, a pair of clamps electrically interconnect the workpieces with the welder circuit and also retain the workpieces positioned against each other in the desired relationship. When the welder is energized a surge of welding current flows between the clamps and the workpieces and across the resistance formed at the point of contact between the two workpieces. The flow of welding current through this resistance generates sufficient heat to melt and weld the two workpieces together.

It is inherent in this welder that the same welding current which flows through the junction of the workpieces must also flow through the resistance where the clamps hold the workpieces together. As a consequence, a substantial amount of the weld energy is dissipated in the resistances where the clamps engage the workpieces. The amount of energy that is lost in this manner is large compared to the amount of energy dissipated in the weld and it therefore materially reduces the efficiency of the welder. Also, the amount of this loss is of a variable and random nature and greatly interferes with the accuracy of the weld. As the size of the workpieces decreases, the magnitude of the losses becomes larger in relation to the weld energy and, therefore, the degree of inaccuracy increases as the size of the workpieces decreases. To produce consistent resistance welds, it is necessary for the resistance of the junction between the workpieces to be constant between the successive welds. This requires a time consuming and expensive operation of preparing the contacting surfaces of the workpieces to insure they are cleaned and/or shaped to provide the correct intimate engagement therebetween.

Since the workpieces are in intimate engagement prior to, during and after the flow of the welding current, it is very difficult, if not impossible, to very precisely control the amount of energy that is dissipated in the weld. Numerous attempts have been made to devise resistance welders having means for controlling the welding current. However, because of the inherently very low resistance of the junction, the voltage thereacross is very low but the magnitude of the welding current is extremely high. This has heretofore resulted in employing very heavy duty and cumbersome switching equipment that is unreliable in operation and subject to rapid wearing. As a consequence, the use of resistance welders as a practical matter has been limited to such applications as spot welding sheet materials of substantial thicknesses together. Although satisfactory welds can be made on such materials, the weld is inherently concealed between the members and is not readily available for visual inspection. Also, the size of the weld is determined by the size of the clamp members and cannot be readily varied. Resistance welders have not been suitable for welding small members such as wires in an end-to-end or butt weld.

Another form of welder that has been available heretofore for welding a pair of workpieces together is the so-called impact welder. In this form of welder, the workpieces are initially separated by a substantial air gap. The welder is then energized and the two workpieces are brought together at a rapid rate and with a very substantial force. At the time of initial impact or in some instances slightly therebefore, an arc is struck between the two workpieces. It is the purpose of this arc to heat the adjacent surfaces of the workpieces to a sufficient degree to cause the workpieces to be forged or welded as a result of the impact. In such a welder, the initial event is the moving of the members toward each other. Following this, the welding currents are generated. As a consequence, the operation of the entire welder must be synchronized with the motion of the two workpieces as they approach each other. This restricts the welding cycle and the timing thereof to one that is compatible with the motion of the impacting of the members rather than one that produces the optimum weld. It will thus be seen that the welding cycle must be started in response to the workpieces moving together and the size of the air gap therebetween and the flow of current cannot be controlled independently. Numerous efforts have been made to provide means for controlling the welding current in the required synchronism with the impacting of the members. However, these have resulted in elaborate electrical circuits having switching means for switching the full welding currents "ON" and "OFF" and have been unreliable and unsatisfactory in operation. As a consequence, the use of impact welders has been confined to the welding of relatively large members such as studs, etc., to a heavy plate.

Another form of welder that has recently been developed is the so-called pulse arc welder such as disclosed and claimed in copending now abandoned applications Serial Nos. 141,060, filed September 27, 1961, by Delbert L. Phillips and assigned to the New Twist Connector Corporation, and 192,862, filed May 7, 1962, by Delbert L. Phillips and assigned to the Pulse Arc Welder Corporation. In such a welder theamount of energy required for the weld is first stored in an energy storage means and workpieces are separated by a predetermined air gap. The stored energy is then discharged into an electrical arc that extends across the air gap so as to heat the two members suitable for welding them together. Prior to the arc discharge and during at least a portion of the arc and, if desired, even after the arc discharge has been completed the workpieces may be separated by an air gap that is suitable for the required arc discharge. When the workpieces have been properly heated to a molten state by the arc discharge, the workpieces are brought together.

In welders of this variety, the workpieces are normally small members such as a wire and the mass of the material that is melted is very small so that it very rapidly congeals back into a solid. Also, the entire arc discharge is completed within a short interval on the order of only a few milliseconds. As a consequence it is necessary for the timing of the closing of the air gap and the contacting of the members to be very precisely timed in relation to the dissipation of heat in the arc.

It is now proposed to provide welding means that will overcome the foregoing difficulties. More particularly, it is proposed to provide welding means for producing an electrical discharge arc across the air gap between a pair of workpieces that contains a precisely controlled amount of energy and is capable of accurately positioning the workpieces prior to and during the discharge of the arc, and will then move the workpieces together after they have been properly heated for welding together, but before they have cooled too much to be welded. This is to be accomplished by providing welding means having a control circuit for producing an arc between a pair of workpieces and having a holder or fixture that will retain the workpieces positioned in a spaced relation to form an air gap therebetween that is suitable for the striking of an arc and the maintenance thereof. At the instant that the arc discharge has progressed to the point where the workpieces are properly melted for welding the fixture will move the workpieces together. The holder or fixture includes means that are electrically interconnected with the control circuit and are responsive to the occurrence of the welding current to move the workpieces together in synchronism with the arc and only during the portion thereof when a proper weld will result.

These and other features and advantages of the present invention will become readily apparent from the following detailed description of a limited number of embodiments of the present invention, particularly when read in connection with the accompanying drawings wherein like reference numerals refer to like parts, and wherein.

Figure 1:
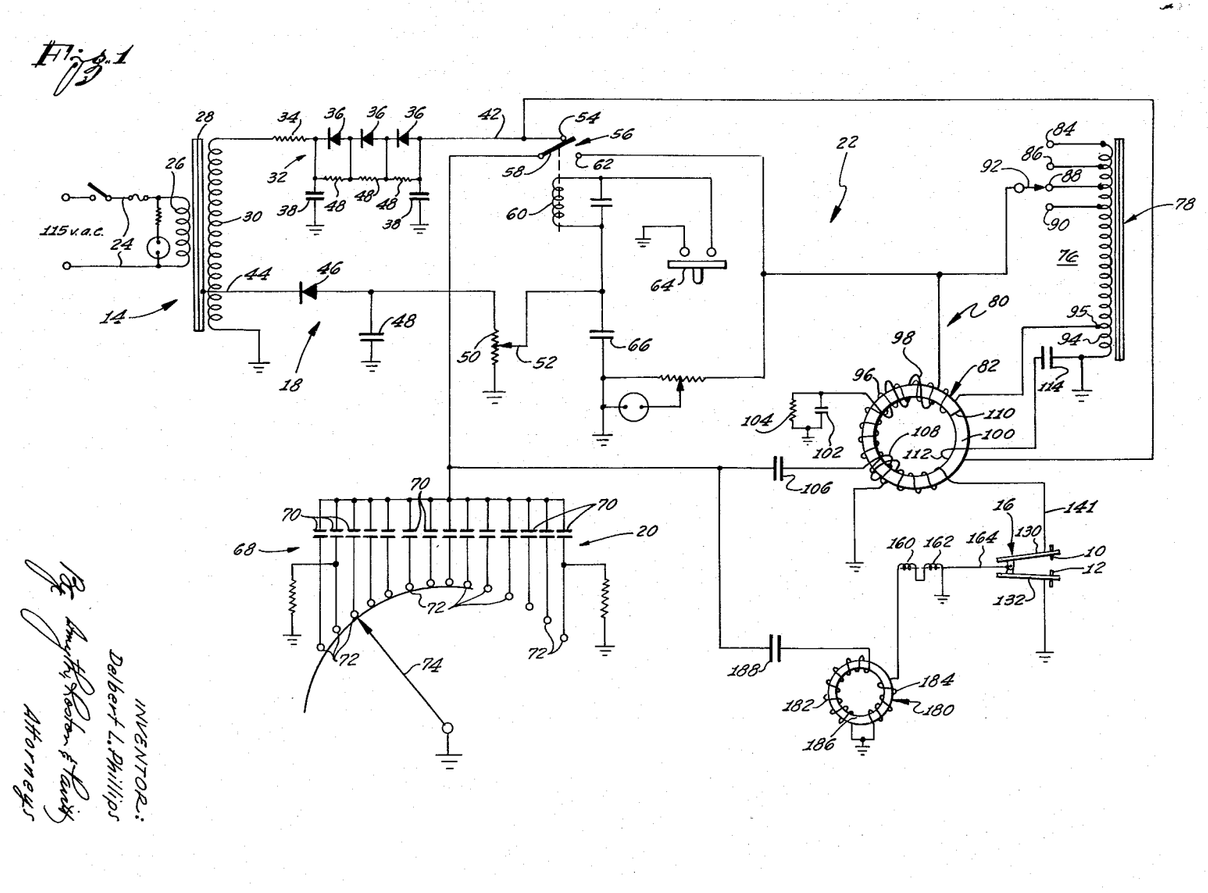
FIGURE 1 is a wiring diagram of welding means embodying one form of the present invention.

Referring to the drawings in more detail, the present invention is particularly adapted to be embodied in a welder for welding a pair of workpieces 10 and 12 together. This means includes a welding control circuit 14 for supplying electrical energy to the two workpieces 10 and 12 and controlling the discharge of the energy between the workpieces and a workpiece holder or fixture 16 for properly positioning the two workpieces 10 and 12 with respect to each other during the electrical discharge.

The control circuit 14 may be of any desired variety for striking an electrical discharge between the two workpieces 10 and 12 and insuring the correct amount of energy being discharged in the arc for producing the required amount of heating of the workpieces. By way of example, the welding circuit may be similar to the welder disclosed and claimed in copending (now abandoned) application Serial No. 141,060 on a welder filed on September 27, 1961, by Delbert L. Phillips and assigned to New Twist Connector Corporation and refiled as a continuation application Serial No. 259,688 on February 19, 1963, or it may be similar to the welder disclosed and claimed in copending application Serial No. 192,862, on a welder filed May 7, 1962, by Delbert L. Phillips and Lewis Clark Feightner and assigned to Pulse Arc Welder Corporation, and refiled as a continuation application Serial No. 260,448, on February 26, 1963, which applications are incorporated herein by reference and form a part hereof as though fully set forth therein.

The control circuit 14 includes a power supply section 18, an energy section 20, and a coupling section 22 for coupling the energy from section 20 to the two workpieces 10 and 12.

The power supply section 18 includes a pair of electrical conductors 24 which may be interconnected with a suitable power source such as a conventional 115-volt alternating current supply line. The conductors 24 are interconnected with a primary winding 26 of a conventional step-up transformer 28.

One end of the secondary 30 may be connected directly to ground while the opposite end is connected to a suitable rectifying means 32. The present rectifying means 32 includes a load resistor 34 in series with a plurality of diodes 36. A plurality of filtering condensers 38 and resistors 48 may be provided between the diodes 36 and ground. The diodes 36 will act as a half wave rectifier and thereby provide a pulsating D.C. voltage on the high voltage supply line 42, and the condensers 38 will be effective to tend to smooth out the pulsations into a steadier voltage. The load resistor 34 will tend to limit the maximum amount of current flow to an amount compatible with the capacities of the diodes 36 and transformer 28.

The secondary 30 of the transformer 28 may be effective to increase the voltage to a higher amount so that the voltage on the supply line 42 is greater than the input voltage. Although the level of this voltage may be any desired level, it is preferable for it to be compatible with readily available parts. For example, it may be at a level that will result in a voltage on the line 42 in a range on the order of 500 to 1000 volts.

The secondary 30 of the transformer 28 may also include a center tap 44 that forms a low voltage source. The center tap 44 may be connected to a diode 46, a grounded condenser 48 and a grounded potentiometer 50. The diode 46 and condenser 48 will be effective to rectify the current and produce a D.C. potential at the movable contact 52 of the potentiometer 50. The turns ratio between the primary 26 and the portion of the secondary 30 between ground and the center tap 44 may be such that the resultant voltage across the entire potentiometer 50 will be on the order of 30 volts.

The high voltage supply line 42 may be connected between the output end of the rectifying means 32 and a stationary contact 54 in a single-pole, double-throw switch 56. Although the switch 56 may be of any suitable variety, it has been found desirable for movable contact 58 of the switch 56 to be actuatable by means of a relay coil 60. Normally, the coil 60 will be deenergized and the movable contact 58 will be maintained against the fixed contact 54. However, whenever the coil 60 is energized, the contact 58 will move into electrical engagement with the second fixed contact 62. One side of the coil 60 may be operatively interconnected with ground by means of a normally open trigger switch 64. The opposite side of the relay coil 60 is connected to the movable center tap 52 of the potentiometer 50. The coil 60 may also be connected to a condenser 66 that extends from the center tap 52 to ground.

It may be seen that when the trigger switch 64 is open, the diode 46 will cause the condenser 66 to accumulate a charge having a potential corresponding to the setting of the center tap 52 and the relay coil 60 will be deenergized. When the trigger switch 64 is closed, the condenser 66 will instantly discharge through the relay coil 60 and switch 64 to ground. This will energize the coil 60 to sufficient amount to cause the movable contact 58 to move from the first contact 54 to the second contact 62.

When the condenser 66 has discharged, the resistance of the potentiometer 50 will limit the current flow through the relay coil 60 to such a low level that the coil 60 will be unable to hold the contacts 58 and 62 closed. Thus, even though the trigger switch 64 may remain closed indefinitely, once the condenser 66 has discharged, as long as the switch 56 is closed the potential across the coil 60 can never build up enough to cause the relay coil 60 to again close the contacts 58 and 62. However, as soon as the trigger switch 64 opens, the condenser 66 will immediately charge to a sufficient level to energize the coil 60 and close contacts 58 and 62 when the switch 64 is again closed.

The energy section 20 is particularly adapted to provide precisely controlled amounts of energy for discharge through an arc extending between the workpieces 10 and 12. Although there are numerous means for accomplishing this, in the present instance, the energy section 20 includes energy storage means such as a bank 68 of condensers 70. One side of each condenser 70 may be connected to the movable contact 58 in the switch 56 by means of conductor 71. The opposite side of each condenser 70 is separately or independently connected to one of the fixed contacts 72 in switch means 74. The switch means 74 may be of any desired variety for connecting the second sides of the condensers 70 to ground. In the present instance, the switch means 74 includes a movable contact that is connected to ground and is arranged for collectively engaging the successive fixed contacts 72. By making the condensers 70 of varying capacities, the effective capacity of the bank 68 may be varied through a wide range by merely rotating the switch 74. The capacity of the bank 68 is preferably sufficient to permit the storage of an amount of energy in a range on the order of .4 to 40 watt-seconds and to permit a choice of a large number of energies therebetween.

The remaining fixed contact 62 in the double-throw switch 56 may be connected to the coupling means 22. The present coupling means 22 includes a first branch 76 having a step-down autotransformer 78 and a second branch 80 having an output transformer 82. The lower end of the transformer 78 is connected directly to ground while the upper end includes a plurality of input taps, each of which is connected to one of the contacts 84, 86, 88 and 90 in a multiposition switch 92.

The lower section 94 of the transformer 78 is provided with an output tap 95 that will provide a voltage reduced from the voltage at the switch 92. The amount of reduction is determined by the effective turns ratio resulting from the setting of the switch 92. More particularly, if the switch 92 is set on the contact 90, the voltage at the tap 95 will be highest and if the switch is set on the contact 84, the voltage will be lowest. The tap 95 is connected to one end of a secondary winding 96 on the transformer 82. The opposite end of the secondary winding 96 may be connected to one of the workpieces 10 in the holder or fixture 16.

The lower section 94 of the transformer 78 has an internal capacitance and an inductance with a nutral resonant frequency that will produce a "ringing" in the section 94. This frequency may be any amount that will produce the optimum results for the particular workpieces to be welded. By way of example, the "ringing" frequency may be on the order of 5 or 10 megacycles. If necessary, a condenser may be placed across the section 94 to modify this frequency.

The second branch 80 of the coupling means 22 extends from the fixed contact 62 of the switch 56 to a primary winding 98 on the transformer 82. The transformer 82 may include a core 100 that inductively couples the primary and the secondary windings 98 and 96 together. The core 100 may consist of a suitable magnetic material such as a ferrite whereby the transformer 82 may operate effectively at high frequencies. It has also been found desirable to employ a ferrite having a very small amount of residual magnetism so that it will have very little, if any, residual or permanent magnetism left therein after a welding cycle. It is also desirable for the core to have a low saturation such that it will saturate very rapidly when the first branch or the second branch 80 are energized. When so saturated, the impedance of the windings and the coupling therebetween will decrease. Although there are a large number of ferrite materials that are suitable for this use, it has been found, by way of example, that Ferroxcube 104 manufactured by the Ferroxcube Co. is particularly well suited for this use.

The primary winding 98 preferably has only a small number of turns and the secondary 96 has a very large number of turns so that the voltage across the secondary 96 will be very large in camparison to the voltage applied to the primary 98. The lower end of the primary winding 98 is connected to ground by means of a condenser 102 and a resistor 104. The internal inductance and capacitance of this circuit, including the primary winding 98 have a natural resonant frequency so as to form a ringing circuit. The "ringing" frequency of this circuit is preferably several times as high as the ringing frequency of the section 94 and, by way of example, may be in a range extending from several hundred megacycles up to several kilomegacycles.

It may be seen that if the condensers 70 in the bank 68 are charged and the workpieces 10 and 12 are separated by an air gap, an electrical arc discharge may be produced across the air gap. More particularly, if the trigger switch 64 is closed, the condenser 66 will discharge through the coil 60 and cause the movable contact 58 to engage fixed contact 62. Because of the open circuit formed by the air gap and because of the impedance of the transformer 78, the initial portion of the discharge energy from the condenser bank 68 will flow through the branch 80 and the primary winding 98. This will produce an initial pulse in the secondary 96 that will also appear across the air gap between the electrodes 10 and 12. The primary 98 has only a small number of turns and the secondary has a large number of turns and the voltage in the secondary will be stepped up to a very high level.

The amount of this increase in voltage will, in part, be a function of the ratio between the number of turns in the winding 98 and the winding 92. However, the amount of increase will also be a function of the resonant character of the primary winding 98 and the capacitance 102. Since the winding 98 has a small number of turns and therefore a small resistance, it will have a very high "Q" ratio, i.e., the ratio of reactance to resistance. As a consequence, any currents of the resonant frequency will cause voltages to build up to very high levels across the primary winding 98. This will cause a correspondingly larger voltage to build up in the secondary winding 96. As a consequence, the increase in the voltage produced between the electrodes 10 and 12 will be several times as great as the turns ratio.

In addition, since the primary winding 98 has a high "Q," the voltage will build up very rapidly and include an alternating frequency component having a frequency equal to the natural resonant frequency of the winding and the capacitance 102. As may be seen from FIGURE 11, the initial high voltage pulse will rise to its peak value in approximately one-quarter of a cycle or in a small fraction of a microsecond. It has been found that the frequency may be somewhere in a range of several hundred megacycles up to several kilo-megacycles. The duration of this pulse may be on the order of one-half a microsecond or longer. Some time during the existence of the high voltage, high frequency pulse created between the two electrodes 10 and 12, the air gap will ionize and become electrically conductive. As a result, an igniting arc will be produced between the electrodes having a high voltage and a low energy.

Simultaneously with the foregoing, a portion of the energy will be travelling through the branch 76 and into the transformer 78. As the energy progresses through the autotransformer 78, it will enter the portion 94 and a voltage will build up at the center tap 95. This voltage will also appear on the secondary winding 96 and across the gap between the two electrodes 10 and 12. During normal operating conditions, this voltage will appear at the workpieces or electrodes sometime during the interval when the initial arc is in existence. Although this voltage will be insufficient to strike an arc, it will be sufficient to sustain the arc once it has been established. As a consequence, the energy will be discharged into the arc so as to heat the adjacent surfaces of the workpieces suitable for welding them together.

It should be noted that all of the energy discharged into the arc will be derived from the bank of condensers 68. As a consequence, the switch 74 may be set to permit the accumulation of a charge of energy exactly equal to that required for welding the pieces together. At the same time, the switch 92 may be set so as to control the rate at which energy is discharged into the arc. If the metal being heated is a thermal conductor such as copper or aluminum, it is normally desirable to set the switch 92 so as to produce a high voltage arc. This will result in a rapid discharge with a high intensity, but shorter heating of the workpieces. If the metal or alloy being heated is a material such as stainless steel which has a poor thermal acceptance or is a material that cannot withstand high temperatures for some reason such as it tends to gasify, it is normally desirable to set the switch 92 to produce a lower voltage. This will provide an arc that is cooler but which has a longer duration. In either mode of operation, all of the amount of energy dissipated in the arc comes from condenser bank 68 and as a consequence, the total amount of heating will remain constant.

It should be noted that in the event of an abnormal condition such as the operator being in contact with the electrodes 10 and 12, the air gap will not have an infinite resistance. Instead, the gap will have a resistance on the order of a few thousand ohms and will also have some reactance. This impedance will be reflected back into the primary winding 98 and will be effective to substantially reduce the "Q" or ratio of reactance to resistance and to also greatly decrease the resonant frequency of the winding 98. Under these circumstances, when the initial surge of energy circulates through the branch 80, there will not be an extreme build up of voltage and the period of time required for the build up to occur will be greatly extended. As a result of the delay in the build up, an arc will not be struck across the electrodes 10 and 12 prior to the time that the energy is developing within the portion 94 of the transformer 78. Under these circumstances, the resistance of the gap will be several thousand ohms rather than the few ohms or less of a conductive arc. Since the energy will follow the path of least resistance, it will flow directly through the portion 94 to ground and be dissipated without the operator being injured as a result of his contact with the electrodes.

Figures 11, 12:
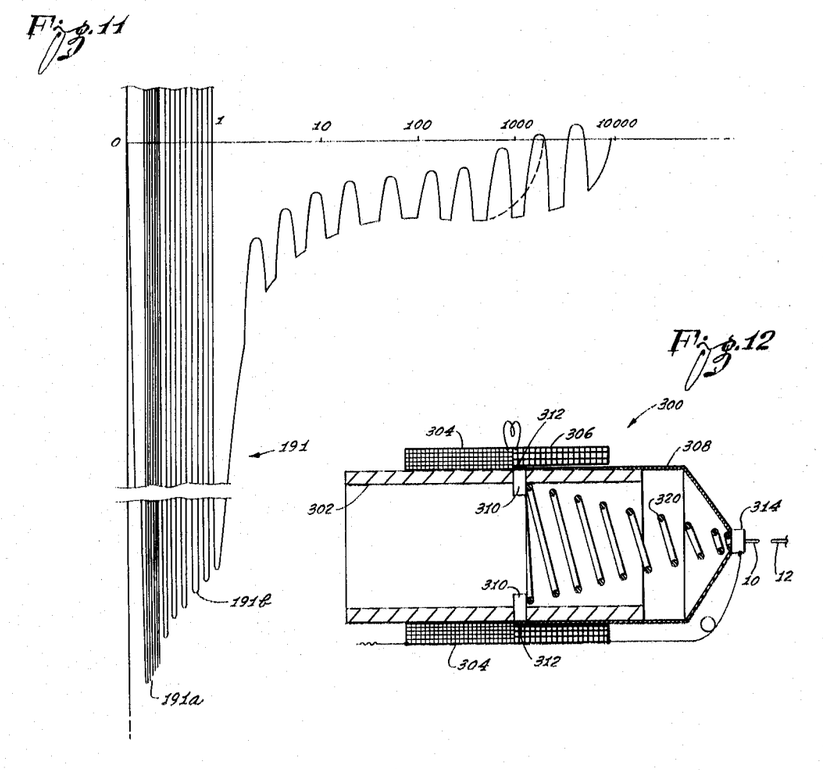
FIGURE 11 is a graph of the logarithm of the potential present between the workpieces plotted against the logarithm of the time of an electrical discharge.
FIGURE 12 is a view of an additional embodiment of the present invention.

In summary, as may be seen from FIGURE 11 which is drawn to a scale logarithmic in both co-ordinates, during normal operation, upon closing the switch contacts 58 and 62 a high voltage pulse 191 will be created across the gap between the workpieces. This pulse will rapidly rise to a maximum value on the order of 100,000 volts in an interval of about one-half a microsecond or less. This pulse will also include a very high frequency component that may be in a range that includes the high megacycle, low kilomegacycle region. The duration of this pulse will be on the order of a fraction of a microsecond up to one or two microseconds, but it will cause the air in the gap to ionize and strike an arc. Once the arc is struck the resistance of the air gap will decrease to a region of one or two ohms or less and the remaining energy may flow through the autotransformer 78, winding 96 and through the arc across the air gap to ground. The majority of the energy from the bank 68 will follow this latter path. As may be seen in FIGURE 11, the interval required for this discharge to be completed may be on the order of a few milliseconds. Although this duration may be varied over a wide range, as will become apparent subsequently, the duration may be in the general range of about 1 millisecond up to about 4 milliseconds. The amount of energy discharged in the arc will correspond to the energy stored in the bank 68 and will cause at least a portion of the ends of the workpieces 10 and 12 to melt. Thus, during the interval 116, the adjacent end surfaces of the workpieces 10 and 12 will be at least partially melted and it will be possible to weld the two members together by placing them in intimate contact.

To obtain an adequate capacity in the bank 68, it is frequently necessary for the condensers 70 to be of the electrolytic variety. Although such condensers have very large capacitances, they may discharge so slow that they limit the rate at which the potential can build up across the air gap. To overcome this effect, a condenser 106 and a coil 108 may be provided between the movable contact 58 and ground substantially parallel to the bank 68. Since the condenser 106 does not require a large capacity, it may be of a variety that discharges very rapidly. The coil 108 will induce an initial pulse in the winding 96 that builds up very rapidly and increases the duration of the very high frequency, high voltage pulse that strikes the arc. For example, by the proper choice of condenser 106 and coil 108, the rise time of the pulse may be on the order of one-half a microsecond or less and the peak voltage may be on the order of at least 20 to 40 kilovolts up to several hundred kilovolts.

It has also been found desirable for the core 100 to include a small gap 110 that will be effective to stop the circulation of spurious high frequency signals through the core 100 without adversely affecting the lower frequency or D.C. signals. By way of example, the gap 110 may be on the order of 0.0002 inch. Such a gap may be formed by cutting radially inwardly through the core 100 and filling the gap 110 with a suitable resin.

Although the core may consist of a ferrite having a very small residual magnetism, under some conditions, the gap 110 may tend to polarize with the pole faces on the opposite sides thereof becoming permanently magnetized. Since this polarization tends to interfere with subsequent operation, it is desirable to insure the depolarization of the air gap 110 after each welding cycle. This may be accomplished by means of a small coil 112 wound on the core 100 and electrically connected between the high voltage line 42 and a condenser 114 that leads to ground. It may be seen that after the completion of each welding cycle, when the movable contact 58 returns to fixed contact 54, a surge of current will flow through the coil 112 and demagnetize the gap 110.

Figure 2:
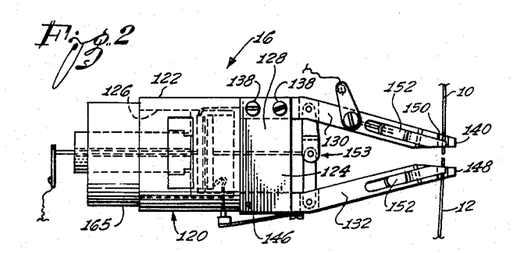
FIGURE 2 is a plan view of a workpiece holder or fixture employed in the welding means of FIGURE 1.

The workpieces 10 and 12 are secured in the workpiece holder or fixture 16 so that the adjacent surfaces thereof will be properly positioned prior to and during the welding operation. As previously stated, the workpieces are initially separated by an air gap that is of the proper dimensions for striking an arc. However, once the arc has been struck and at least a portion of the members are melted, they may be moved together before the molten material begins to solidify. The present workpiece holder includes a housing 120 of an insulating or electrically nonconductive material such as Micarta. Although the housing may be of any desired configuration, in the present embodiment, it has a barrel portion 122 with an extension 124 projecting from one end thereof. The barrel portion 122 has a substantially cylindrical surface that is concentric with the axis of the housing and a passage 126 that extends axially inwardly from the end remote from the extension 124. This passage 126 may be substantially cylindrical and concentric with the barrel portion 122. The present passage 126 terminates in the barrel portion and near the beginning of the extension 124.

The extension 124 may be formed by cutting away portions of an original cylinder to leave a pair of flat chordal surfaces 128. These surfaces 128 are preferably parallel to each other so that the extension will be of substantially uniform thickness and of a width substantially equal to the diameter of the barrel portion 122.

A pair of work-positioning arms 130 and 132 may be provided in the holder so as to project from the end of the extension 124. The arm 130 includes a mounting section 134 and a work-support section 136. The mounting section 134 is substantially straight and is positioned in a groove recessed into a side of the extension 124. The groove extends diametrically inwardly substantially parallel to the two flat sides 128. Fastening means such as a pair of screws 138 may extend through the extension 124 and the mounting section 134 to thereby rigidly retain the arm 130 in a fixed position relative to the housing. The work supporting section 136 of the arm 130 may project from the end of the extension 124 and be angularly disposed with respect to the mounting section 134. This will result in the section 136 extending diagonally inwardly so that the end 140 of the section 136 will be adjacent the center line of the housing 120.

The second arm 132 may be similar to the first arm 130 in that it also includes a mounting section 142 and a work supporting section 144. The mounting section 142 may slidably fit into a groove that is recessed into a side of the extension opposite from the first groove. The two grooves will thus be substantially diametrically aligned and in the same plane. The mounting section 142 may be secured in the groove by means of a single pin 146 which passes through the extension 124 and the mounting section 142. The mounting section 142 may be a sliding fit in the groove so that the entire arm 132 may swing about the axis of the pin 146 in a plane substantially parallel to the plane of the first arm 130. The support section 144 of the second arm 132 may project from the end of the extension 124 and be angularly disposed with respect to the mounting section 142. This will result in the section 142 extending diagonally toward the center line of the housing. As a result, the ends 140 and 148 of the two arms 130 and 132 will be disposed close to each other and substantially symmetrically about the center line.

The outer ends 140 and 148 of each of the arms 130 and 132 may include means for securing the workpieces 10 and 12 thereon. In the present instance, this means includes a pocket 150 that is recessed into the side of the arms for receiving a workpiece. In the present instance, these pockets 150 are particularly adapted to receive a relatively small member such as a wire and retain it generally normal to the axis of the housing. In addition, a clamp is provided for retaining the workpiece seated in the pocket 150. In the present instance, the clamp includes an elongated leaf spring 152 that has one end positioned to project over the pocket 150 and bear on any workpiece disposed therein. The opposite end of the spring 152 may extend along the arm and project outwardly therefrom. Thus, by depressing the outwardly-projecting portion of the spring 152 toward the arm, the first end will be deflected out of the pocket and permit workpieces to be placed in the pocket 150 or removed therefrom. A conductor 141 may interconnect the arm 130 to the output side of the transformer 82.

The outer ends 140 and 148 of the arms 130 and 132, and particularly the work-supporting portions 136 and 144, may be maintained properly positioned with respect to each other by means of a linkage that is effective to swing the arm 132 about the pin 146. In the present instance, this linkage includes a toggle mechanism 153 that is secured between the two arms immediately adjacent the end of the extension 124. More particularly, the toggle mechanism 153 includes a pair of links 154 and 156 which have their outer ends pivotally secured to the two arms 130 and 132. The inner ends of the two links 154 and 156 are connected to each other by means of a pivot joint 158 disposed substantially coincident with the axis of the housing 120.

The lengths of these two links 154 and 156 are such that when the two links are in approximate alignment with each other, they will spread the second arm 132 from the first arm 130 the correct amount to position the ends 140 and 148 for initiating a welding operation. When the joint 158 is pushed axially outwardly a predetermined distance, the toggle mechanism 153 will pass over center and pull the second arm 132 toward the first arm 130 and move the end 148 of the arm 132 to a proper distance from the first end 140 to conclude the welding operation.

It may thus be seen that by varying the position of the pivot joint 158 during the welding operation, it will be possible to position the workpieces 10 and 12 for striking an arc and to bring them together during the interval 116 when they are properly heated for welding.

Figures 3, 4, 5, 6, 10:
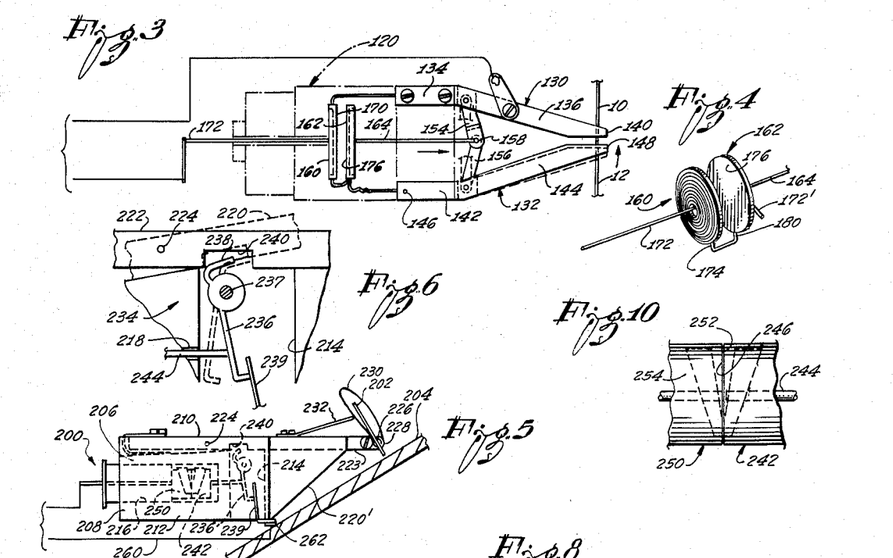
FIGURE 3 is a plan view of the internal moving elements in the holder or fixture of FIGURE 2.
FIGURE 4 is a perspective view of coil means employed in the electrode holder or fixture of FIGURES 2 and 3.
FIGURE 5 is a side view of another form of electrode holder or fixture for use in the welding means of FIGURE 1.
FIGURE 6 is a fragmentary cross-sectional view on an enlarged scale of a portion of the electrode holder or fixture of FIGURE 5.
FIGURE 10 is a side view of the coil means of FIGURE 8.

Since the duration of the interval 116 for contacting the members 10 and 12 may be of relatively short duration, for example on the order of a few milliseconds, it is desirable for the means that moves the pivot joint 158 to be capable of reacting on the same order of time. Although there may be numerous means of accomplishing this it has been found desirable to employ a coil 162 that may have a current circulated therethrough so as to react with a magnetic field and thereby produce a force for moving the members 10 or 12. The coil 162 may be mechanically interconnected with the pivot joint 158 in the toggle linkage 153 and electrically interconnected with the control circuit 14 so as to be energized in synchronism with the welding operation.

Although the coil 162 may be of any desired configuration, it is desirable that it be particularly adapted to be very fast acting and to initially produce a very large force for rapidly accelerating the various moving parts such as the toggle mechanism 153 and the arm 132. The present coil 162 is wound from an electrical conductor such as a single or solid strand of copper wire having a thin insulating layer thereon. The conductor is wound upon itself to form a coil 162 having an outside diameter that will fit into the passage 126 and permit the coil to move axially. The conductor may be wound so that the coil is relatively thin in an axial direction but has a relatively large surface 176 on the end thereof. By way of example the conductor may be wound into a spiral substantially normal to the axis of the passage 126 with all of the convolutions or turns being disposed substantially in the same plane. Such a coil will have an axial thickness approximately equal to the diameter of the conductor. It is also desirable for the spiral to be in a plane normal to the axis of the coil as this will cause the surface 176 to be normal to the axis of the passage 126. A bonding material such as a plastic resin may be applied to the convolutions of the coil so as to insure the coil retaining its shape.

One end of the conductor may project from the center of the coil 162 so as to form an electrical lead 178 to one end of the coil. The other end of the conductor may extend from the periphery of the coil to form a second lead 180. Thus, by applying a potential to these two leads 178 and 180, a current will flow through the coil 162 in a spiral pattern concentrically about the axis of the coil. The magnetic lines of flux resulting from the concentric lines current will add together to generate a magnetic flux field having the lines of flux disposed substantially normal to the plane of the end surface 176. An elongated connecting rod 164 may be reciprocally disposed in a passage extending axially of the barrel portion 122 and the extension 124. One end of this rod 164 is secured to the center of the coil 162 while the other end is connected to the joint 158 in the center of the toggle mechanism 153. The length of the rod 164 may be adjusted so that when the coil 162 is at its innermost position the joint will be pulled slightly over center so that the arms 130 and 132 will be locked in their separated positions. Also when the coil 162 is at its outermost position the joint 158 will be pushed over center so as to move the arm 132 toward arm 130.

The coil 162 may react against a second flux field that may be produced by any suitable means. However, in the present instance, it is produced by a second coil 160. The coil 160 may be substantially the same as the first coil 162. More particularly, it also includes a conductor that is wound upon itself to form a spiral substantially normal to the axis thereof. The coil 160 may be secured onto the end of a plug 165 that fits into the end of the passage 126. The surface 170 formed by the end of the coil 160 may be substantially a plane that is also normal to the axis and substantially parallel to the end surface 176 on the first coil 162. One end of the conductor may extend from the center of the coil to form a first lead 172, while the other end of the coil extends from the periphery to form a second lead 174. By applying a potential to these two leads 172 and 174, a current will flow through this coil 160 to generate a second magnetic flux field. The lines of flux will extend from the end of the coil 162 substantially normal to the plane of the end surface 170. As a result, the lines of flux emerging from the surfaces 170 and 176 will be substantially parallel to each other.

The two coils 160 and 162 may be electrically interconnected with the control 14 so that the two magnetic fields will react with each other in synchronism with the discharge of the arc. This may be accomplished in any suitable manner. By way of example, the two coils may be electrically disposed in the conductor 141. Thus, each time a surge of welding current flows through the electrodes 10 and 12, the same current will flow through the coils 160 and 162 and produce a reaction therebetween. However, whenever the welding current is varied, the reaction will also vary and it will be necessary to make a corresponding adjustment to the fixture 16. Accordingly, it may be desirable to interconnect the coils 160 and 162 into the circuit independently of the actual welding current. One means for accomplishing this is shown in FIGURE 1. In the embodiment, a transformer 180 is provided that has a primary winding 182 and a secondary winding 184 that are coupled to each other by means of a core 186. The core 186 may be of a magnetic material such as a ferrite that will not have excessive losses at higher frequencies. The primary winding 182 has one side connected directly to ground and the other side connected to the movable contact 58 by means of a coupling condenser 188. The secondary winding 184 has one side connected directly to ground while the other side is connected with the lead 172 for one of the coils 160. The lead 174 from the opposite end of the coil 160 is connected to a lead 180 on the other coil 162 while the remaining lead 178 is connected to ground.

Normally, the switch 56 will have the contacts 54 and 58 closed. The condenser 188 will then be charged and no current will flow through the primary winding 182. However, when the contact 58 moves away from the contact 54 and against 62, the condenser 188 will discharge through the primary winding 182 and cause a corresponding pulse in the secondary.

It may be seen that the current from the secondary 184 will simultaneously circulate in both of the coils 160 and 162. The current in the two coils 160 and 162 will cause the magnetic flux fields therefrom to be simultaneously generated. The leads 172, 174, 178 and 180 to the coils 160 and 162 are interconnected so that the polarity of the two fields will be opposed to each other. The result of this will be a repulsive force tending to separate the two coils 160 and 162. If the surfaces 170 and 176 shown in FIGURE 3 are initially in intimate contact with each other, the strength of the reaction will be a maximum before the coils begin to move.

Once the coils begin to separate, the force will tend to decrease. However, it is during the beginning of the motion when all of the moving parts are static that the large inertial forces must be overcome. Once the motion has commenced, the maintenance thereover requires less force. Thus, the two coils 160 and 162 will magnetically react almost instantly to produce a very large mechanical force. Since the inertia of these coils is very low, the coil 162 will begin to move very rapidly. As a result, the current in the two coils may be of a very short duration. For example, the duration of this current may be on the order of a millisecond. This, in turn, will permit the current density in the conductor to be extremely high without causing excessive heating that might otherwise damage the insulation or the means for retaining the coil in a rigid integral structure. As soon as the coil 162 commences its motion, the toggle mechanism 153 will move over center and move the members together.

In order to employ the present means for welding two members such as a pair of wires 10 and 12 together, the primary of the transformer may be connected to a suitable power source such as a 115 volt A.C. line. This cause an alternating voltage to develop between the center tap 44 and ground and also between the end of the secondary winding 30 and ground. The diode 46 and condenser 48 will be effective to rectify the A.C. voltage from the center tap 44 and cause a D.C. potential to appear across the potentiometer 50. The condenser 66 will then accumulate a charge that is determined by the setting of the center tap 52. However, since the trigger switch 64 is open, the relay coil 60 will be deenergized and the switch 56 will be positioned with contacts 54 and 58 closed and contacts 58 and 62 open.

At the same time, the rectifying means 32 will rectify the voltage from the secondary 30 and permit a high D.C. voltage to be present on the supply line 42. This high voltage will travel through the contacts 54 and 58 of the double-throw switch 56 to all of the condensers 70 in the bank 68. The condensers 70 that are connected to ground as determined by the settings of the switch 74 will thereby accumulate charges having a voltage approximately equal to the peak voltage across the winding 30. The switch 74 is, of course, set so that the amount of energy stored in the bank 68 will correspond to the amount of energy required to weld the particular workpieces being employed. That is, the larger the workpieces and the greater the heating required, the more condensers 70 will be included. In addition, the high voltage present at the contact 58 will cause a charging current to flow through the condenser 106 and primary 108 to ground whereby the condenser 106 will accumulate a charge. At the same time, the condenser 188 will accumulate a charge.

If it is desired to weld two members such as a pair of wires 10 and 12, together, the two arms 130 and 132 of the holder or fixture 16 may be separated from each other and the workpieces 10 and 12 placed thereon. Although the exact positioning of the workpieces 10 and 12 is not critical, they may be disposed in substantial axial alignment with each other and with their ends separated by a small air gap. The dimensions of this gap are not critical but the length thereof is such that control circuit 14 may be capable of striking an arc across the gap. By way of example, this arc may be on the order of .020–.070 inch.

Following the proper positioning of the workpieces 10 and 12 on the holder 16, the trigger switch 64 may be closed either manually or automatically. The closing of the trigger switch 64 will permit the charge on the condenser 66 to discharge through the relay coil 60. This will cause the movable contact 58 in the switch 56 to move away from the fixed contact 54 and into engagement with the other fixed contact 62. The charge on the condenser 66 will rapidly dissipate through the coil 60 and the contact 58 will return to the contact 54. As soon as the charge on condenser 66 has dissipated, the setting of the potentiometer 50 will limit the current flow through the coil 60 to a level inadequate for retaining the movable contact 58 against the fixed contact 62. Thus even though the trigger switch 64 may remain closed, the condenser 66 will not be able to build up a charge and the coil 60 will never be able to pull the contact 58 back to the contact 62.

However, during the brief interval that the movable contact 58 is positioned against the fixed contact 62, the charges accumulated on the condensers 70, 106 and 188 will discharge. The charge in the bank 68 will flow through the switch 56 to the fixed contact 62. Initially, at least a portion of the discharging energy will follow the branch 80 and flow through the primary winding 98 to ground. The winding 98 comprises a small number of turns having a high resonant frequency with the capacitance 102 and having a high "Q," i.e., ratio of reactance to resistance. This flow of current will cause a high frequency, high voltage pulse 191 to be induced in the secondary winding 96 so as to appear across the air gap between the electrodes. The voltage will rise in a vertically straight line fashion to its peak value. The time required for this rise will be on the order of one-half microsecond or less. The pulse 191 will contain a high frequency component 191a that will be in the region of a kilomegacycle and will persist for a few hundredths of a microsecond. Following this, a component 191b will occur that will be in the region of about 100 or 200 megacycles. Although the duration of the pulse 191 and the components therein may vary over a wide range, it is preferably on the order of one or two microseconds or until the branch 76 is fully conductive. However, during this interval, the air between the electrodes 10 and 12 will ionize and an arc will be struck so as to make the air gap electrically conductive. At this time, the resistance of the gap will be in the region of 1 or 2 ohms or less.

At approximately the same time that the arc is struck, the major portion of the discharging energy will have travelled through the branch 76 and the transformer 78 so as to cause a voltage to build up at the center tap 95. This build up in voltage will be transferred through the secondary winding 96 and to the electrodes 10 and 12. Although this voltage will be inadequate to strike an arc, it will be of sufficient magnitude to maintain the arc until substantially all of the energy in the bank has been discharged. This portion of the arc is the primary source of the energy that heats the two workpieces and it will be effective to raise the temperature sufficiently to cause at least a portion of one or both of the workpieces to form a plastic viscous mass.

The rate at which energy is discharged into this arc is a function of the voltage thereacross and the duration is a function of the amount of energy discharged and the rate at which it is discharged. If the metal being heated is a good thermal conductor such as aluminum or copper, it is desirable to set the switch 92 to produce a high voltage and a more rapid discharge. This will result in a more intense but shorter heating of the workpieces. If the metal or alloy being heated has a material therein that cannot withstand high temperatures for some reason such as that it tends to gasify or that it has a poor thermal conductivity, it may be desirable to set the switch 92 to produce a lower voltage with a correspondingly cooler but longer lasting arc.

Irrespective of the setting of the switch 92, the period of time required for the discharge of enough energy to heat the workpieces is preferably a relatively short interval. By way of example, the interval may be one or two milliseconds or somewhat less than four milliseconds. Within such short time limits, it has been found that the heat cannot diffuse over a wide area. As a consequence, the heating and/or melting of the workpieces is confined to the immediate area of the weld. This drastically reduces the amount of heat that is required to produce the weld. Also, since very little metal is heated, very little of the workpiece is annealed. Also, within this relatively short period, there is very little, if any, oxygen that can come in contact with the heated portions of the workpieces including the molten portions and there is an inadequate time for the metals to oxidize.

At the same time that the movable contact 58 engages the fixed contact 62, the condenser 188 will be disconnected from the high voltage supply line 42. As a result, the condenser 188 will discharge through the primary winding 182 of the transformer 180. Since the path for this discharge has an extremely low resistance, the discharge will be very rapid. For example, the discharge of energy through the winding 182 may be completed within an interval of about 1 millisecond. This winding 182 may have a tendency to "ring" and produce a flow in the kilocycle region. This will induce a corresponding voltage in the secondary winding 184. The turns ratio of the transformer 180 may be effective to reduce the voltage across the secondary 184 to a potential on the order of about 50 to 100 volts. As a result of reducing the voltage and because of the very short duration of the discharge, the maximum amount of the current will be very large. By way of example, this current may be in a range on the order of at least 30 to 70 amperes or higher.

The resultant surge of heavy current in the secondary winding 184 will then flow through both of the two coils 160 and 162. Because of the multiple turns of the two coils and the heavy current, the flux field will be very high. The flux lines in both fields are normal to the end surfaces 170 and 176 and are substantially parallel to each other. The two leads 174 and 180 are chosen such that the magnetic lines of the flux will oppose each other and produce a reaction force. The coils 160 and 162 are wound and connected such that the fields will always react with each other with a repulsive force that will bias the two coils 160 and 162 apart. It should be noted that if the current in one coil reverses, the current in the other field will reverse and, therefore, the two fields will still oppose each other and produce a repulsive force. As a consequence, a repulsive force will be produced irrespective of whether the coils are energized by a direct current or an alternating current.

Initially, the two surfaces 170 and 176 will be in intimate contact with each other. Thus, the flux fields will react at their point of maximum density and the initial force will also be a maximum. As the two fields react, they will force the coil 162 to move away from the coil 160 and carry the link 164 with it. This motion of the link 164 will cause the pivot joint 158 to move outwardly and vary the toggle mechanism 153 over center. This will effectively shorten the length of the mechanism 153 and force the arm 132 to rotate about the pin 146 and swing toward the other arm 130. The workpiece 12 secured to the end of the arm will be carried with it. As a consequence, the ends of the two workpieces 10 and 12 will be forced into intimate contact with each other. Prior to this contact, the arc discharge will have heated the contacting portions to a plastic viscous mass. As a consequence, the viscous masses on the two workpieces will merge into one viscous mass which may eventually cool and result in the two workpieces 10 and 12 being welded together. The size of this weld may be controlled by varying the size of the charge on the condensers 70 and to some extent by the position of the switch 92.

It should be noted that in this embodiment, there are no magnetic cores in either of the coils 160 or 162 which may saturate or otherwise absorb energy. As a consequence, these coils may have a high "Q," i.e., a high ratio or reactance to resistance whereby the currents may rapidly build up therein. The repulsive reaction between the two fields will commence approximately as fast as the currents can build up in the two coils. It may thus be seen that the repulsive forces acting on the two coils 160 and 162 may be made to commence reacting approximately as fast as the arc strikes. Since the pulse of current through the two coils 160 and 162 is on the order of a millisecond duration, the current densities in the wires may be of very large magnitude without causing damage or overheating of the coils 160 and 162. This, in turn, will permit the creation of very high flux densities. Since the two surfaces 170 and 172 are initially in intimate contact with each other, these fields will react with each other in the regions where the flux densities are at their maximum. It may thus be seen that during the initial portion of the welding cycle when the various portions of the fixture are static, a maximum force will be available to initiate movement of the parts and thereby create a maximum rate of acceleration. By a proper balancing of the magnitude of the repulsive forces produced by the coils, the timing of the currents in the coils and the masses of the moving parts such as the arm 132, the motion of the arm 132 can be made to occur within a very short time interval of the initiation of the arc. This will permit the workpieces to remain static and separated by an air gap at the time the arc is struck and even during a portion of the arc discharge. This permits the choice of an air gap that is optimum for producing an arc discharge that will heat the ends of the workpieces for producing an optimum weld. Following the desired heating, the workpieces may begin to move. Normally, it is desirable to cause the contact to occur during a period on the order of 1 or 2 milliseconds after the initiation of the welding cycle. However, under some circumstances, it may be desirable for this interval to be on the order of 4 milliseconds. By limiting the welding operation to a short period in this range, it has been found that excessive annealing, oxidizing and other deleterious effects may be greatly reduced or entirely eliminated.

Under some circumstances, it may be desirable for the expected life of the arc discharge to be greater than this range whereby the arc would normally terminate slightly later than the expected instant of contact. When operating in this mode, the fixture 16 will move the electrodes 10 and 12 into contact while the arc is still in existence. The contacting of the electrodes will short out the arc so that the terminal portion 200 of the arc will be extinguished. This will permit a control over the time at which the arc is extinguished.

As a consequence, it may be seen that even though the workpieces may be members such as wires having little mass, they will be consistently brought into intimate contact at the precise instant during which the members are properly melted even though they may tend to cool very rapidly after the arc is extinguished.

The foregoing holder or fixture 16 is particularly adapted to butt weld the ends of a pair of wires or similar members together. In the event it is desired to weld a member such as a wire onto a second member having a large flat surface such as formed by a metal chassis, it may be desirable to employ a holder or fixture 200 such as shown in FIGURES 5–10, inclusive. This embodiment is particularly adapted to be employed as a hand held tool. It is effective to position the end of a member such as a small wire 202 so that an arc may be struck between the end of the wire and a flat surface 204 and to then position the end of the wire 202 against the surface 204 during the portion of the arc when the two members are properly heated for producing a weld.

Figure 7:
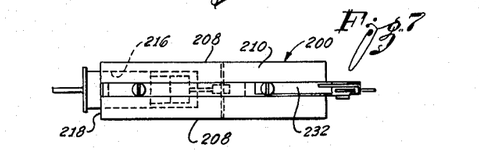
FIGURE 7 is a plan view of the electrode holder or fixture of FIGURE 5.

This embodiment 200 includes a housing 206 fabricated from an electrically non-conductive material. The housing 206 may include a pair of substantially flat, parallel sides 208 as well as an upper side 210 and a lower side 212. The upper side 210 may be provided with a groove that is recessed into the side 210 so as to extend substantially the entire length of the housing 206. This groove may have a substantially rectangular cross section. In addition, a opening 214 or passage may be provided which extends from the side 212 toward the groove. A substantially cylindrical passage 216 may extend inwardly from one end 218 of the housing 206 so as to terminate adjacent the opening or passage 214. A passage 218 of smaller diameter may be provided substantially coaxial with the first passage 216 so as to extend the remaining distance through the housing 206 and open onto the side of the opening 214. The end 220' of the housing remote from the end 218 may be angularly disposed with respect to the sides 210 and 212.

A work-positioning arm 222 may be provided on the housing 206 for retaining the wire member 202 in position. The present arm 222 is an elongated member having a generally rectangular cross-section which will permit the arm to fit loosely into the groove. The length of this arm 222 may be slightly greater than the length of the housing 206. Thus, one end of the arm may be disposed adjacent the end of the housing 206 while the other end 223 extends beyond the end 220' of the housing 206. A pin 224 may be provided which extends transversely of the housing so as to pass through the arm 222. This pin 224 will permit the arm 222 to pivot about the axis thereof. This swinging motion will permit the outer end 223 of the arm 222 to be raised or lowered through a predetermined range relative to the end of the housing 206.

The outer end 223 of the arm 220 may form a mounting section which is particularly adapted for retaining a workpiece such as a wire positioned thereon. Although any suitable form of retaining means may be employed, the present means includes a clamp having a pair of concentric sleeves 226 and 228 having aligned slots therein which are of sufficient size to receive a wire. A lever 230 may be interconnected with one of these sleeves 226 so as to facilitate movement of the sleeve 226 relative to the other sleeve 228. By depressing the lever 230 the recesses will be aligned with each other so that a wire may be positioned therein. A spring 232 may be mounted on the arm 220 so as to bias the lever 230 and rotate the sleeves 226 and 228. This will tend to cause misalignment of the recesses and clamp the wire therein. When the corner formed by the junction of sides 212 and 220' is placed against the surface 204 the end 223 of the arm will be immediately adjacent the surface 204. When the arm 220 is in its extended position the end of the wire 202 will be separated from the surface 204 but when it is in its retracted position the end of the wire will engage the surface 204.

A spring may be provided in the groove and operatively interconnected with the arm 220 so as to cause the arm 220 to rotate clockwise about the axis of the pin 224 and into a retracted position. In addition, a latch mechanism 234 may be provided in the opening 214 for retaining the arm 220 in an extended position. The present latch mechanism 234 includes a lever 236 which is mounted on a pin 237 that extends transversely of the housing and through the opening 214. The upper end of this lever 236 includes a finger 238. This filter 238 is positioned to bear upon the bottom of the arm 220 and retain the arm 220 in its extended position when the lever is rotated in its clockwise direction. A spring 239 may be provided for biasing the lever 236 clockwise. A recess 240 may be provided in the arm 220 so that when the lever 236 is rotated in its counter-clockwise direction, the end of the finger 238 will disengage the arm 220 and pass into the recess 240. When the finger 238 is in the recess the spring will bias the arm 220 toward its retracted position. It will thus be seen that the latch mechanism 234 may be effective to retain the arm 220 in its extended position with the end of the wire 202 separated from the surface 204 or permit the arm 220 to move into the retracted position whereby the wire 202 is placed in intimate contact with the surface 204.

It may thus be seen that by raising the arm 220, the spring 239 will rotate the lever 236 clockwise and thereby set the latch mechanism 234 so that the finger 238 will engage the arm 220 and retain it in its extended position. The end of the wire may then be separated from the surface 204. By swinging the lever 236 about the pin 237 and against the spring 239, the end of the finger 238 will slide into the recess 240. The arm 220 will then no longer be supported in the elevated position and the spring will be free to rotate the arm 220 about the pin 224 and thereby carry the end of the wire against the surface 204.

It has been found desirable for the means that controls the position of the lever 236 to be operatively interconnected with the welding control circuit 14 and to be sufficiently fast acting to synchronize the release of the latch mechanism 234 with the heating of the workpieces. Although there are numerous means which may be employed for this purpose, in the present instance a coil 242 is provided that is effective to react with a magnetic field to thereby trip or release the latch mechanism 234 and allow the lever 236 to move about the pin 237. The coil 242 may be disposed adjacent the inner end of the passage 216 and have a link 244 attached thereto. This link 244 extends through the small passage 218 and thereby operatively interconnects the coil 242 with the lever 236.

Figures 8, 9:
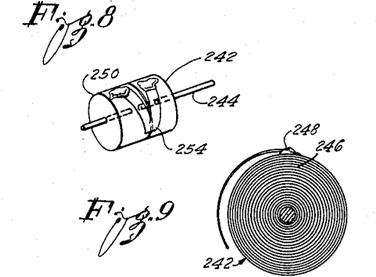
FIGURE 8 is a perspective view, on an enlarged scale, of the coil means employed in the electrode holder or fixture of FIGURE 5.
FIGURE 9 is an end view of the coil means of FIGURE 8.

The coil 242 in this embodiment includes an electrical conductor such as a thin ribbon of copper. One end of this ribbon may be electrically and mechanically connected to the link 244 and then wound upon the link 244. This will form the conductor into a spiral which is substantially concentric with the axis of the link 244. The ribbon may have an insulating layer such as baked enamel thereon to separate the adjacent turns of the coil. Or alternatively a thin layer of insulating material such as a plastic film similar to Mylar may be laid upon the copper ribbon as it is being wound. A suitable bonding material such as a plastic resin may be employed for bonding the entire coil into a single rigid structure that will permanently retain its shape. After the coil has been wound in the foregoing manner one end may be cut off to form a substantially flat or plane surface 246. This surface may be normal to the axis of the link 244 and to the passage 216. It will thus be seen that by applying a potential to the link 244 and the end 248 of the ribbon on the periphery of the coil 242 a magnetic field will be produced wherein the lines of flux will emerge from the surface 246 substantially normal thereto.

A second magnetic flux field may be provided within the passage so as to react with the magnetic field from the first coil 242. Although this field may be produced by any suitable means, in the present instance a second coil 250 is provided which is substantially identical to the first coil 242. More particularly, this coil is formed by winding a ribbon of electrically conductive material into a cylinder of substantially the same size and shape as the first coil 242. One end of this coil 250 may also be cut off to form a substantially flat or plane surface 252 that is normal at the axis. This coil 250 may be mounted on a plug 254 that will fit onto the end of the passage 216 and retains the coil 250 substantially concentric therewith. The inner end and outer ends of the conductor forming the coil 250 may form the heads to the coil such that a potential applied thereto will cause a current to circulate in a spiral pattern and produce a flux field normal to the surface 252.

The ends of the conductors on the periphery of the coils may be connected together so that the two coils are in series and the same current flows in each. In the present instance a resilient member such as a metal clip 254 is mechanically and electrically connected to the ends of the two coils 242 and 250. This clip 254 may be effective to resiliently retain the two coils immediately adjacent with the two surfaces 246 and 252 disposed immediately adjacent to or in contact with each other.

In order to employ this embodiment 200 for welding a member such as a wire 202 onto a flat surface such as formed by a chassis, the embodiment 200 may be interconnected with the welding control means 14. This may be accomplished by interconnecting the coils 242 and 250 into the conductor 141 so that the welding current will flow therethrough or they may be connected with the secondary 184 of the transformer 180. This interconnection may include a ground wire 260 that is connected to a contact button 262 at the corner of sides 212 and 220. The arm 220 may be interconnected with the winding 96 of transformer 82. The lever 230 may then be depressed and the wire 202 placed in the recesses in the ends of the sleeves 226 and 228. The lever 230 is then released so as to cause the wire to be clamped in position. The arm 222 is then raised into its extended position long enough to permit the spring 239 to rotate the lever 236 about the pin 237 and cock the latch. This will place the finger 238 against the arm 220 and retain it in its extended position. In addition, the lever 236 will cause the link 244 to place the surfaces 246 and 252 on the ends of the coils 242 and 250 in intimate contact with each other. Following this, the grounded contact 262 on the housing 206 is placed on the surface 204 so as to ground the surface 204. The end of the wire 202 may also be spaced from the surface 204 the correct distance for striking an arc. The trigger switch 64 may then be closed so as to initiate the welding cycle. This will result in the high voltage, high frequency pulse 191 being imposed between the wire 202 and the surface 204 whereby an arc will be struck between the two. Simultaneously, a surge of current will flow through the two coils 242 and 250. The inter-reaction between the two flux fields will produce a very large repulsive force which will separate the surfaces 246 and 252. The coil 242 will then move and cause the link 244 to rotate the lever 236 about the pin 237 and disengage the finger 238 from the arm 222. The arm 220 will then move the wire in intimate contact with the surface 204. By this time, a sufficient amount of energy will have been dissipated in the arc to cause at least a portion of the metal to be in a molten state suitable for producing a weld.

In the foregoing embodiments, the coil means are not disposed on a ferrous core. Instead, they employ air cores and thereby eliminate any delay that may result from building up a flux field. It has been found that although a ferrous core may increase the flux density and the reaction forces, as a general rule there is a time delay resulting from energy being transferred into the core that increases the time delay in obtaining a movement. As a consequence, the preceding embodiments are normally extremely fast-acting. More particularly, it is believed that motion can be initiated within one or two microseconds of the time that the current commences building up in the coils and it has been found that the motion of the winding and contacting of the electrodes 10 and 12 can be completed in less than one millisecond. Although such a high speed operation may be desirable in many applications, in some instances it may be desirable to extend the contacting of the workpieces for several milliseconds. Although electronic means may be provided for creating a delay in the energizing circuitry, it has also been found desirable to employ the embodiment 300 of FIGURE 12. In this embodiment 300, a magnetic core 302 is provided. Although this core may consist of any suitable material, it has been found that a thin walled, hollow tube of hot rolled iron may be employed. The first coil 304 may be wound upon the core 302 so as to be rigidly affixed thereto. The second coil 306 may be wound so as to fit around the tubular core 302 and be axially movable thereon. It has been found desirable to employ a thin, lightweight coil form 308. This form includes a cylindrical portion that is a sliding fit on the exterior of the core 302. The second coil 306 may be wound on the exterior of the cylindrical portion so as to have one end thereof in intimate engagement with the end of the first coil 304 when the form 308 is in a retracted position.

In order to secure the form 308 in its retracted position one or more small magnets 310 may be provided on the core 302 and one or more small pieces 312 of iron may be provided on the form 308. This will produce a small force that will be effective to retain the form in its retracted position but will permit it to be moved to its extended position.

The form 308 may have a fastener 314 thereon for having one of the electrodes such as 10 secured therein. The end of the electrode 10 will be separated from the electrode 12 by an air gap when the form 308 is in its retracted position. However, when the form 308 is extended, the electrode 10 will contact the electrode 12. A spring 320 may be provided inside of the form 308 for biasing the form 308 outwardly. This force is inadequate to separate the magnets 312 from the magnets 310 but will be strong enough to keep the form 308 extended once it is extended.

In order to employ this embodiment, the coils 304 and 306 may be connected in series with each other and with a suitable energizing circuit. When the welder is energized to produce the arc between the electrodes 10 and 12, the windings 304 and 306 will be energized. This will cause opposed magnetic flux fields to build up in the core 302 and between the windings 304 and 306. These fields will then react and cause the windings 304 and 306 to separate and move the electrodes 10 and 12 into contact. Initially, these windings 304 and 306 will be very close together so that the fields will react very strongly to overcome the inertia of the static members. By a proper balancing of the energizing current, the inductance of the coils, the size of the core and the masses of the form and coil, the time required for contacting the workpieces 10 and 12 may be extended to about 4 milliseconds or longer if desired. It should be noted that although the presence of the core may extend the time of contacting the resultant increase in the flux field will create a greater force behind the movement.

Figure 13:
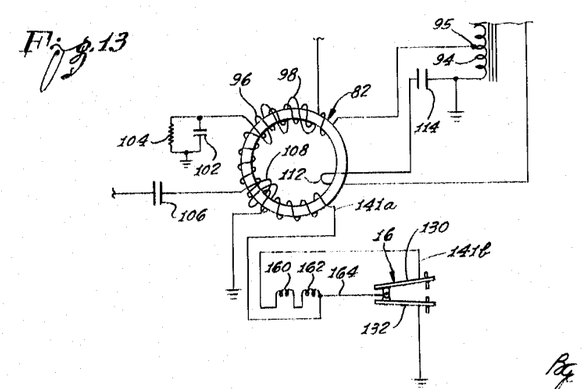
FIGURE 13 is a view of an additional embodiment of the present invention.

As a further alternative, the embodiment of FIGURE 13 may be employed. This embodiment may employ any of the fixtures in the foregoing embodiments. However, for purposes of illustration, this embodiment is shown as employing a fixture similar to that in FIGURES 2 to 4, inclusive. More particularly, a fixture 16 is provided that includes a pair of support arms 130 and 132 for carrying the electrodes or workpieces 10 and 12.

A toggle mechanism 153 may be provided for retaining the arms 130 and 132 separated so as to form an air gap between the two workpieces 10 and 12. In order to control the position of the toggle 153, a pair of coils 160 and 162 may be provided so as to react against the link 164. This link 164 will separate the arms 130 and 132 when the coils 160 and 162 are in contact and will cause the electrodes to engage when the coils separate.

In order to energize the two coils 160 and 162, they may be connected in series with each other and with the conductor 141a and conductor 141b. The conductor 141a is connected to the end of the winding 96 while the conductor 141b is connected to the arm 130. It may thus be seen that when a welding operation is to be performed, the switch 56 will close contacts 58 and 62 and thereby discharge a portion of the energy from the condensers 70. Initially, this energy will flow through branch 80 and produce a high frequency, high voltage pulse in the branch 76. This pulse will flow through the coils 160 and 162 and strike an arc across the air gap between the electrodes 10 and 12. The amount of current and energy in this pulse will not be large enough to produce a material reaction between the coils 160 and 162. Following this, the main portion of the energy will discharge through the branch 76 and produce a large welding current. This welding current will flow between the electrodes 10 and 12 and produce a heating thereof that will form a viscous or plastic mass suitable for welding the members together. At the same time, the welding current will flow through the windings 160 and 162 and cause a repulsive force to be created between the two coils 160 and 162. This, in turn, will force the two electrode members 10 and 12 together. The timing of the contact will vary with the amount of welding current, etc., and will therefore be a function of the members being welded. Although this may require several welding fixtures for welding an assortment of workpieces, it will eliminate the necessity for a separate energizing circuit and the transformer 180. Thus, it is particularly useful when a large number of substantially identical operations are to be performed.

It may thus be seen that welding means have been provided for producing an electrical discharge between a pair of workpieces and to precisely position the workpieces prior to and during the arc. While only a limited number of embodiments of the present invention have been disclosed, it will be readily apparent to those skilled in the art that numerous changes and modifications may be made without departing from the spirit of the invention. Accordingly, the foregoing drawings and description are for illustrative purposes only and do not limit the invention which is defined only by the claims that follow.

What is claimed is:

1. A pulse arc welder for producing an electrical arc discharge across an air gap between a pair of workpieces, said welder comprising the combination of:
    means operatively coupled to said workpieces for retaining said workpieces in a first position separated from each other by said air gap and in a second position in contact with each other,
    energy storage means for accumulating an electrical charge of energy containing the amount of energy required to be dissipated in said arc,
    a first discharge path having a high resonant frequency,
    a second discharge path coupled to said first discharge path and said energy storage means and including said air gap,
    control means having a first operative relationship effective to prevent the discharge of said charge of energy from said storage means and having a second operative relationship for connecting at least said first discharge path to said energy storage means and creating between said workpieces a high voltage pulse having said high frequency for the production of an initial arc between said workpieces and for obtaining the discharge of the rest of said energy from said energy storage means through said second path and through the air gap to form a continuation of said initial arc at a high energy level, and
    means responsive to the discharge through said second discharge path for moving said workpieces to the second position.

2. A pulse arc welder for discharging a pulse of energy between a pair of electrode members separated by an air gap, said welder comprising:
    energy storage means having a capacity for storing all of the energy required to be dissipated in said arc;
    a first discharge path connected to said electrode members to include said air gap;
    means operatively coupled to said electrode members for retaining said electrode members in a first position separated by said air gap and at such a distance from each other, that said storage means is prevented from discharging through said first path as long as no initial arc is struck;

a normally disabled second discharge path coupled to said first discharge path, and when enabled producing a high frequency-high voltage in said first discharge path for striking an arc across said gap and causing said air gap to become electrically conductive for the discharge of energy in said storage means through said first path into said arc;

means structurally disposed in said retaining means and electrically connected to said discharge paths for being energized when said arc is struck and moving said electrode members into said second position during the discharge of said energy through said second discharge path; and controllable means for selectively enabling and disabling said second discharge path.

3. A pulse arc welder for producing an electrical arc discharge across an air gap between a pair of workpieces, said welder comprising the combination of:

energy storage means for accumulating an electrical charge of energy containing the amount of energy required to be dissipated in said arc, a first discharge path having a high resonant frequency, a second discharge path including said air gap, said second path being coupled to said first discharge path, control means having a first operative relationship effective to isolate said discharge paths from said energy storage means so as to prevent the discharge of said charge of energy from said storage means and having a second operative relationship for connecting said discharge paths to said storage means for discharging an initial portion of said charge through said first path to create a high voltage pulse between said workpieces having said high frequency for the production of an initial arc between said workpieces to thereby make said air gap electrically conductive for discharging the rest of said energy through said second path in dependence upon said initial arc to form a continuation of said initial arc at a high energy level, means for positioning said workpieces so as to define said air gap having dimensions insufficient to strike an arc at the voltage of said charge in said storage means, and in a position of contact with each other, and means mechanically disposed in said last means and electrically disposed in said second discharge path to be responsive to the discharge of energy through said second path to move said workpieces so as to reduce said gap and from said first position into said second position of contact during said discharge.

4. A pulse arc welder for discharging a pulse of energy between a pair of electrode members separated by an air gap, said welder comprising:

energy storage means having a capacity for storing all of the energy required to be dissipated in said arc, a discharge circuit including a first discharge path and a second discharge path, control means including a switch for momentarily connecting at least a portion of said circuit with said energy storage means for discharging the energy stored therein through said circuit, said first discharge path being connected directly to said electrode members so as to include said air gap, said first path having a large resistance when said arc is electrically non-conductive and a low resistance when said arc is electrically conductive.

said second discharge path being effective during said moment to discharge an initial portion of the energy in said storage means therethrough to produce a high frequency, high voltage in said first discharge path for striking an arc across said gap and causing said air gap to become electrically conductive for the discharge of the remainder of the energy in said charge through said first branch and into said arc, means for retaining said members in a first position separated from each other by said air gap and in a second position in contact with each other, and electromagnetic means in said last means for moving said members from said first position into said second position, said electromagnetic means being operatively interconnected with said control means for being energized during the discharge of the energy stored therein for moving said members into said second position and closing said air gap within a few milliseconds of the striking of said arc.

5. In combination for providing an arc discharge across an air gap between first and second members, means for retaining said first and second members in a first position separated from each other by said air gap and in a second position in contact with each other, a source of alternating voltage having a particular frequency, energy storage means, rectifying means coupled to the voltage source and to the energy storage means for rectifying the alternating voltage, a charging circuit interconnecting said rectifying means with said storage means for maintaining a charge of energy in said storage means having a voltage related to the peak voltage of said alternating source, said charging circuit having a time constant that is short compared to the frequency of said source, control means having a switch with first and second operative positions and being operable between said first and second positions at a frequency less than said particular frequency, said switch when in said first operative position being effective to prevent a transfer of energy from the energy storage means, said switch means when in the second operative position being effective to provide for a transfer of energy from the energy storage means, means operatively coupled to the control means and to the first and second members for producing a voltage pulse at a high frequency upon each operation of the switch into the second position to obtain an arc discharge at a low energy level between the first and second members to decrease the resistance of the space therebetween, means operatively coupled to the energy storage means and to the first and second members and responsive to the initiation of the arc discharge and the resultant decrease of said resistance between the first and second members for producing a continuation arc discharge of the energy in the energy storage means in a pulse at a high energy level to heat portions of the first and second members to an at least partially molten state, and a solenoid mechanically disposed in said first means and electrically interconnected with said control means for being energized when said switch means is in said second operative position, said solenoid when energized being effective to move said members into said second position and into contact during the interval said portions are in said state.

6. A device of the class described for discharging an electrical arc across the space between a pair of workpieces comprising the combination of:

means operatively coupled to said workpieces for positioning one of said workpieces adjacent the other of said workpieces, a control circuit electrically interconnected with said workpieces, said circuit including a first portion for striking an initial electrical arc between the adjacent surfaces of said workpieces and a second portion for discharging a predetermined amount of energy into said arc to form a continuation of the arc, switch means interconnected with said control circuit to energize said first portion to strike said arc and to energize said second portion for continuing said arc, and means operatively interconnected with said first means and said control circuit and responsive to the actuation of said switch to move said surfaces on said workpieces into engagement during an interval subsequent to the commencement of the continuation arc and the discharge of energy from said second portion.

7. A device of the class described for discharging an electrical arc across the space between a pair of workpieces comprising the combination of:

means operatively coupled to said workpieces for retaining said workpieces in a first position adjacent each other and in a second position in contact with each other, a first control circuit for being operatively interconnected with said workpieces and including means for creating a high frequency pulse between said workpieces having a sufficient potential for striking an electrical arc therebetween, a second control circuit including energy storage means for discharging a predetermined amount of energy into said arc after it has been struck by said first portion, a third control circuit operatively interconnected with said first means for moving said workpieces from said first position into said second position during at least the terminal portion of said arc, and control means for concurrently operating said first, second and third control circuits.

8. A device of the class described for welding one workpiece onto another workpiece, comprising the combination of:

means operatively coupled to said workpieces for positioning one of said workpieces in a first position adjacent the other of said workpieces, electrical energy supply means for connection to said workpieces and for supplying a voltage insufficient to strike an arc when said workpieces are in said first position relative to each other and in a second position in intimate contact with said other workpiece, second means electrically interconnected with said workpieces for striking an arc therebetween, third means electrically interconnected with the workpieces and responsive to the striking of the arc for discharging energy from said energy supply means into said initial arc to form a continuation thereof that heats the adjacent portions of said workpieces to an at least partially melted state, fourth means for concurrently actuating said second and third means, solenoid means mechanically disposed in said first means and electrically connected to said third means for concurrent operation when said energy discharges, said solenoid being effective to move said workpiece from said first position into said second position and in engagement with each other during at least a portion of the interval said arc has heated said workpieces to said partially melted state to produce a weld.

9. The combination of claim 8 wherein said solenoid means includes a pair of windings having the ends thereof in intimate contact with each other when said workpieces are in said first position and being wound so that a current in said windings will produce opposed flux fields that will separate said windings and force said workpieces into said second position.

10. A pulse arc welder for producing an electrical arc discharge across an air gap between a pair of workpieces, said welder comprising the combination of:

energy storage means for accumulating an electrical charge of energy containing the amount of energy required to be dissipated in said arc, means operatively coupled to said workpieces for retaining said workpieces in a first position separated from each other by said air gap and in a second position in contact with each other, said gap having dimensions to prevent the discharge of said storage means at the voltage of said charge, a first discharge path having a high resonant frequency, a second discharge path coupled to said first discharge path and said energy storage means and including said air gap, control means having a first operative relationship in which at least one of said discharge paths is disconnected from said storage means for preventing development of high frequency signals in said first discharge path and having a second operative relationship in which a first portion of energy discharges through said first discharge path to develop high frequency signals only when said two discharge paths are connected to said energy store, said signals effective for the production of an initial arc across the gap when said workpieces are in said first position, the production of said initial arc necessarily resulting in the discharge of the rest of the energy from the storage means to form a continuation of the said initial arc, and means responsive to the discharge of energy from said storage means to move said workpieces to said second position.

11. A device of the class described for discharging an electrical arc across the space between a pair of workpieces, including:

first means operatively coupled to said workpieces for positioning one of said workpieces adjacent the other of said workpieces, energy storage means connected to said workpieces for storing a predetermined amount of energy at a voltage insufficient to cause striking of an arc when said workpieces are positioned by said first means, second means electrically interconnected with said workpieces for striking an initial electrical arc between the adjacent surfaces of said workpieces so that said stored energy discharges into said initial arc to form a continuation arc, and means operatively connected to said first means, being concurrently operated with said second means, and being electrically connected to energized by said storage means, to move said workpieces into engagement thereby covering a predetermined distance.

12. A pulse arc welder for producing an electrical arc discharge across an air gap between a pair of workpieces, said welder comprising the combination of:

energy storage means for accumulating an electrical charge of energy containing the amount of energy required to be dissipated in said arc, means operatively coupled to said workpieces for positioning said workpieces in a first position separated from each other by said air gap and in a second position in contact with each other, said gap having dimensions to prevent the discharge of said storage means at the voltage of said charge, a first discharge path having a high resonant frequency, a second discharge path coupled to said first discharge path and said energy storage means and including said air gap, control means having a first operative relationship in which at least one of said discharge paths is disconnected from said storage means for preventing development of high frequency signals in said first discharge path and having a second operative relationship in which a first portion of energy discharges through said first discharge path to develop high frequency signals only when said two discharge paths are connected to said energy store, said signals effective for the production of an initial arc across the gap when said workpieces are in said first position, the production of said initial arc necessarily resulting in the discharge of the rest of the energy from the storage means to form a continuation of the said initial arc, and means connected to said storage means and being responsive to said second operative relationship of said control means to move said workpieces to said second position.

13. A device as set forth in claim 6, said last means including:

means for initiating movement of said workpieces towards each other after said arc has started, at a maximum amount of acceleration, said means for initiating movement including means for continuing said movement of said workpieces towards each other during said arc with an acceleration that is less than said initial maximum acceleration.

References Cited by the Examiner

UNITED STATES PATENTS

| | | | |
|---|---|---|---|
| 1,327,814 | 1/1920 | Fortescue | 219—95 |
| 1,373,054 | 3/1921 | Chubb | 219—95 |
| 1,638,098 | 8/1927 | Rochette | 317—188 |
| 1,721,348 | 7/1929 | Mawdsley | 319—135 X |
| 2,235,385 | 3/1941 | Rava | 219—113 X |
| 2,488,899 | 11/1949 | Cooper et al. | 219—100 X |
| 2,508,103 | 5/1950 | Dawson | 219—113 |
| 2,540,022 | 1/1951 | Rabenda | 317—188 |
| 2,640,133 | 5/1953 | Ainsworth et al. | 219—98 |
| 2,878,362 | 3/1959 | Quinlan | 219—95 X |
| 2,921,177 | 1/1960 | Gellatly et al. | 219—95 |
| 3,014,155 | 12/1961 | Inoue | 219—113 X |
| 3,052,817 | 9/1962 | Branker | 219—69 X |
| 3,073,946 | 1/1963 | Hazel | 219—95 |
| 3,136,880 | 6/1964 | Glorioso | 219—98 |

RICHARD M. WOOD, *Primary Examiner.*

R. F. STAUBLY, *Assistant Examiner.*